No. 646,781. Patented Apr. 3, 1900.
W. H. WYATT.
TABLE ADJUSTER.
(Application filed Jan. 19, 1900.)

(No Model.)

WITNESSES:
Geo. W. Naylor
J. B. Owens

INVENTOR
William H. Wyatt
BY Munn & Co
ATTORNEYS

UNITED STATES PATENT OFFICE.

WILLIAM H. WYATT, OF NEW YORK, N. Y.

TABLE-ADJUSTER.

SPECIFICATION forming part of Letters Patent No. 646,781, dated April 3, 1900.

Application filed January 19, 1900. Serial No. 2,053. (No model.)

*To all whom it may concern:*

Be it known that I, WILLIAM H. WYATT, a citizen of the United States, and a resident of the city of New York, borough of Manhattan, in the county and State of New York, have invented a new and Improved Table-Adjuster, of which the following is a full, clear, and exact description.

The purpose of this invention is to provide a device by means of which pool or billiard tables may be quickly and effectively adjusted and which when once set will not be disturbed by jarring or vibration of the table or its support—that is to say, the building in which it is placed. In the course of my experiments I have employed a screw in the leg of the table, by means of which adjustments may be made with the greatest nicety; but I have found that these adjustments are readily disturbed owing to the working of the screw occasioned by jarring of the table or by the vibration, however minute, of the building. To overcome this objection, I have provided a screw with a spherical head set in a concave step, and I have produced on these parts interengaging ribs and grooves disposed radially with respect to the axis of the screw, which serve to hold the screw securely and prevent working thereof due to vibration or jarring of the parts. These interengaging ribs and grooves are, however, of such form as permit the screw to be turned when positive pressure is applied thereto in the operation of adjusting the table.

This specification is the disclosure of one form of the invention, while the claims define the actual scope thereof.

Reference is to be had to the accompanying drawings, forming a part of this specification, in which similar characters of reference indicate corresponding parts in all the views.

Figure 1:
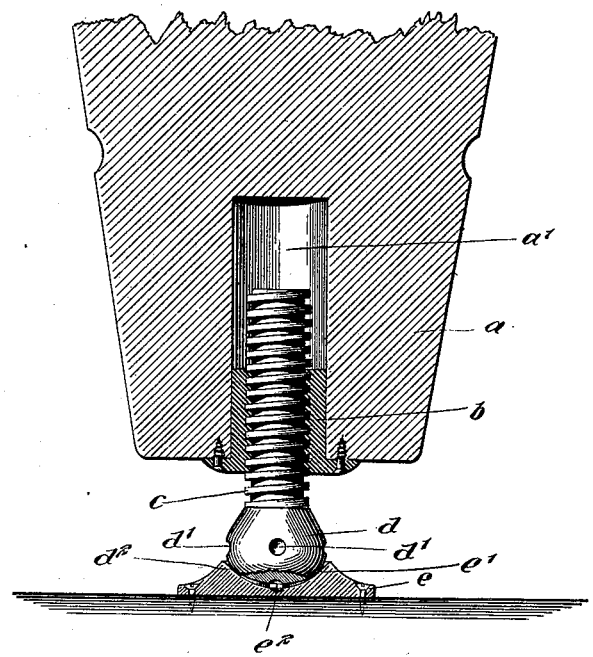
Figure 2:
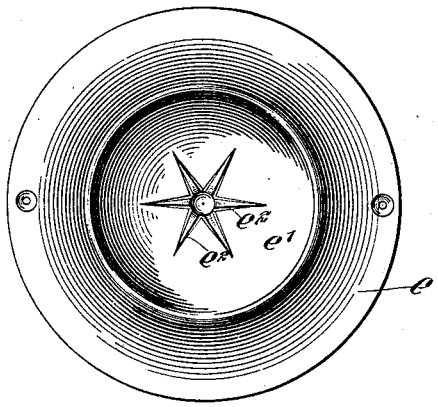
Figure 3:
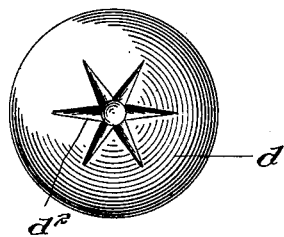

Figure 1 is a vertical sectional view of the invention, showing it in use. Fig. 2 is a plan view of the step, and Fig. 3 is an under plan view of the spherical head of the screw.

Each leg $a$ of the table is formed with a longitudinally-disposed cavity $a'$ in its lower portion, wherein is secured an internally-threaded ferrule $b$, and in this ferrule works a screw $c$. The screw $c$ has its lower end provided with a spherical head $d$, with openings $d'$ to permit the insertion of a tool for turning the screw. As indicated in Fig. 3, the bottom portion of the head $d$ of the screw is formed with a number of grooves $d^2$, which are disposed radially of the axis of the screw. The head of the screw has bearing in a concave recess $e'$, formed in the top of the step $e$, which is adapted to be secured to the floor of the building, as shown. In the cavity $e'$ of the step $e$ a number of ribs $e^2$ are formed, the number of ribs being equal to the number of grooves $d^2$ in the head $d$ of the screw and the parts being so juxtaposed that the ribs will be respectively received in the grooves, by which means the screw is held against turning. The ribs $e^2$ have, as best illustrated in Fig. 2, sloping or inclined sides, which permit the walls of the grooves $d^2$ in the head of the screw to ride over the ribs when positive force is applied to the screw. The result of this construction is, therefore, that the screw may be turned when sufficient force is applied thereto, notwithstanding the engagement of the ribs within the grooves; but no such minor forces as vibration or jarring of the parts will disturb the position of the screw, and consequently the adjustment of the table. By disposing the ribs $e^2$ and grooves $d^2$ radially with respect to the axis of the screw the screw is caused to turn true in the bearing, and its displacement from the bearing is prevented.

Having thus described my invention, I claim as new and desire to secure by Letters Patent—

1. A table-adjuster, comprising a screw, and a bearing on which the head of the screw is mounted, the bearing and head of the screw being formed with interengaging ribs and grooves disposed radially of the axis of the screw, for the purpose specified.

2. A table-adjuster, comprising a screw, and a bearing engaged by the head of the screw, the bearing and the head of the screw being formed with interengaging ribs and grooves, and the ribs having inclined or beveled side walls permitting the walls of the grooves to ride over the ribs when positive pressure is applied to the screw.

In testimony whereof I have signed my name to this specification in the presence of two subscribing witnesses.

WILLIAM H. WYATT.

Witnesses:
JOSEPH A. METCALF,
G. M. H. BURFORD.